March 13, 1962 S. C. CAMPBELL ETAL 3,024,865

SAWHORSE

Filed July 1, 1957

2 Sheets-Sheet 1

INVENTORS
SPENCER C. CAMPBELL
GRANT C. COLEMAN
BY Donald R. Johnson
ATTORNEY

March 13, 1962 S. C. CAMPBELL ETAL 3,024,865

SAWHORSE

Filed July 1, 1957

2 Sheets-Sheet 2

INVENTORS
SPENCER C. CAMPBELL
GRANT C. COLEMAN
BY
Donald R. Johnson
ATTORNEY

United States Patent Office 3,024,865

Patented Mar. 13, 1962

3,024,865

SAWHORSE

Spencer C. Campbell, P.O. Box 7458, and Grant C. Coleman, 600 E. 41st St., both of North Kansas City, Mo.

Filed July 1, 1957, Ser. No. 669,292

8 Claims. (Cl. 182—186)

This invention relates to a sawhorse or trestle.

The novel sawhorse according to the invention provides a combination of simplicity, rigidity, permanence of rigidity and collapsibility, this combination of features having long been recognized to be highly desirable, but hitherto unobtained. The novel sawhorse is capable of being constructed of straight pieces of ordinary lumber, with only simple cutting operations, and of being assembled by the use of ordinary bolts or screws or other simple fastenings, complicated metal parts being avoided. It is also free of any excessive tendency to wobble or shake when in use. In the prior art, the sawhorses of relatively simple construction, assembled by means of bolts or screws, have been subject to the disadvantage that, after they have been in use for a while, the bolts or screws loosen in their sockets, with resulting insecurity of the sawhorse. The sawhorse according to the invention avoids these disadvantages of the prior art. Also, it is capable of being easily dismantled into, for example, two leg assemblies and a rail which can be stored or stacked within a small space.

The invention will be further described with reference to the attached drawing. FIGURES 1 and 2 are end and side elevational views of a sawhorse according to one embodiment of the invention, showing two leg assemblies attached to a top rail, each leg assembly comprising two legs, a spacer block, a stretcher block, means for urging the spacer block and the stretcher block toward each other, and means for urging the legs toward each other.

FIGURES 3 and 4 are partial side and end elevational views, showing different means of attaching a leg assembly to the rail.

FIGURES 5 and 6 are partial side and end views, showing another means of attaching a leg assembly to the rail. FIGURE 7 is a top view of the block 12 illustrated in FIGURES 5 and 6.

Figure 1:
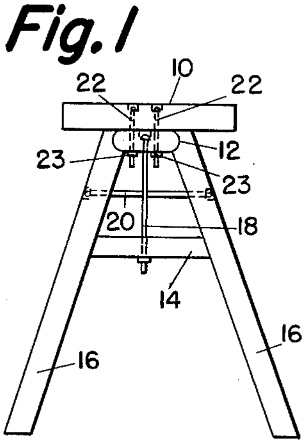
Figure 2:
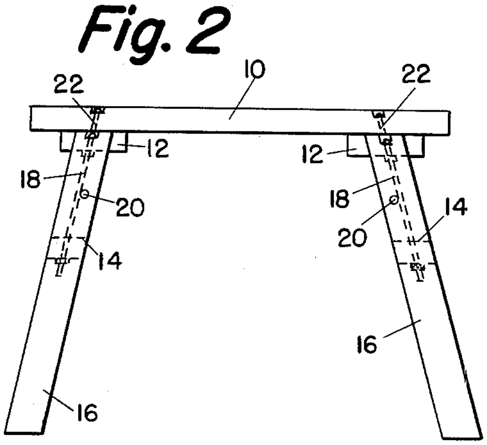

Referring to FIGURES 1 and 2, two leg assemblies are illustrated, each comprising an upper transverse member 12, which will also be referred to subsequently as a spacer block or anchor block, a lower transverse member 14, which will also be referred to subsequently as a stretcher block, and two legs 16. Each leg has a concave recessed portion in an upper part thereof, into which the convex outer surfaces of block 12 are received.

The outer edges of stretcher block 14 have surfaces which are upwardly and inwardly inclined at an angle adapted to correspond with the angle of the inner surfaces of legs 16 when the latter are spread at the desired angle. The spacing apart of the legs 16 is limited by the setting of bolt 20, which is adjustable to any desired length, and bolt 18 is tightened to bring the edges of block 14 upwardly into a tight fit with the inner surfaces of legs 16. By adjustment of the setting of bolt 20, the edges of block 14 can be brought into exact alignment with and tight fit against the inner surfaces of legs 16.

The spacer block 12 has a recessed portion in the top thereof, and a vertical hole is drilled through the block, communicating with the recessed portion. The bolt 18 is passed through the hole and also through a hole drilled vertically in the stretcher block 14. The recessed portion of the block 12 receives the head of the bolt. A nut threaded onto the lower end of the bolt 18 engages the under surface of the stretched block 14.

A horizontal bolt 20 is passed through holes drilled horizontally in each of the legs 16, and the ends of the bolt are received within recessed portions in the outer side of the legs 16. The bolt 20 is adapted to be tightened or loosened as desired. In order to attach the leg assembly to the top rail 10, bolts 22 are inserted through the block 12 and top rail 10 and tightened by means of nuts 23.

In order to assemble the leg assembly, one places block 12 within the upper recessed portions of legs 16 and inserts bolt 20 in the legs, adjusting the bolt to provide approximately the desired spread of the legs. Block 14 is then placed between the legs at the location such that it spreads the legs to the full extent permitted by the bolt 20. Bolt 18 is inserted in blocks 12 and 14 and tightened to make the assembly rigid. The setting of bolt 20 is adjusted if necessary to obtain proper alignment of the edges of block 14 with the inner surfaces of legs 16.

By proper adjustment of the relative amounts of tension of the horizontal and vertical bolts, it is possible to bring all surfaces of the respective parts of the leg assembly into the proper ailgnment and provide a level upper surface on which the top rail 10 rests. Furthermore, any change in alignment that may occur during use of the sawhorse, or any loosening of the parts which may tend to occur in such case, can be quickly and easily remedied by changing the tension on the horizontal or vertical bolts, or both.

From the foregoing description, it is seen that the sawhorse according to the invention combines all of the desirable features which were set forth earlier. The sawhorse is constructed of straight pieces of lumber with only simple cuts. The parts are secured to each other by means of simple bolts, complicated metal parts being avoided. In spite of the simplicity of the construction, the sawhorse avoids the disadvantages of prior art sawhorses with regard to insecurity resulting in shaking or wobbling. Thus, a secure fit of all parts of the sawhorse against each other can be obtained at all times by adjusting tension on the horizontal and vertical bolts. By providing means for applying tension either horizontally or vertically or both, the optimum adjustment can be provided. Finally, the sawhorse is easily dismantled by removal of the bolts 22, into two leg assemblies and a top rail which can be stored or stacked in a small space.

Figure 3:
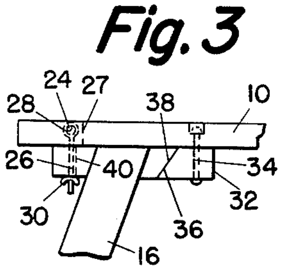
Figure 4:
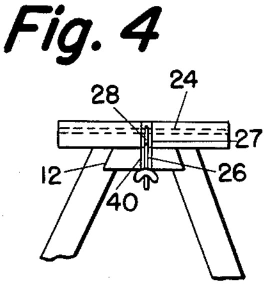

Referring to FIGURES 3 and 4, different means are shown therein for attaching the leg assembly to the top rail.

The horizontal pin 24 is secured within the top rail 10. The bolt 26, having an eye portion 28 in the upper end thereof, is positioned within slot 27 and attached by means of the eye portion 28 to the pin 24. The spacer block 12 has a slot therein within which the bolt 26 is movable in an arc about the pin 24 as center. A wing nut 30 is threaded onto the lower end of the bolt 26, and by tightening this nut, the bolt can be secured in the vertical position, holding the spacer block 12 against the top rail 10. When it is desired to dismantle the sawhorse, the wing nut 30 is loosened, the bolt 26 moved in an arc through and out of the slot 40 in the spacer block 12, which slot extends to the left-hand end of block 12 as shown in FIGURE 3, thus permitting the spacer block to be separated from the top rail. The locking block 32 is secured to the under side of the rail 10 by means of a bolt 34. The block 32 has an inclined surface 36 which is adapted to engage and fit smoothly against a corresponding inclined surface 38 of the spacer block 12. Thus, when the wing nut 30 is tightened, the spacer block 12 is held securely against the under side of the rail 10.

It is to be noted that, if desired, the positions of the locking block and of the pin, spacer block, bolt and wing nut assembly as shown in FIGURE 3 can be reversed.

The spacer block construction of FIGURES 1 and 2, with its convex outer edges, is preferred to that of FIGURES 3 and 4 for example, with its trapezoidal cross section. The convex construction is superior from the standpoint of maintaining, during use of the sawhorse, a smooth and close fit with the concave recessed portions of the legs.

Figure 5:
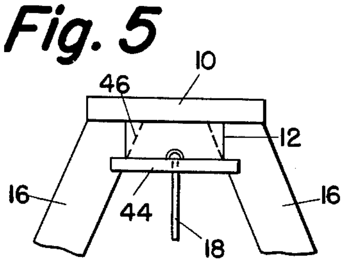
Figure 6:
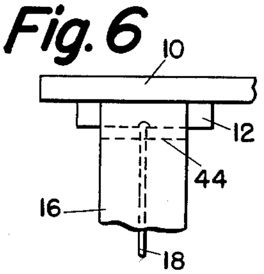
Figure 7:
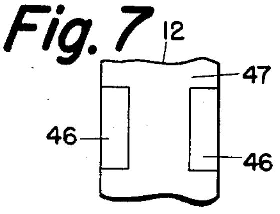

Turning now to FIGURES 5, 6 and 7, other means are shown therein for attaching the leg assembly to the top rail 10. The anchor block 12 has inclined surfaces 46 which are adapted to engage and fit tightly against corresponding inclined surfaces of the legs 16. The shoulder portions 47 of the spacer block are adapted to prevent movement of the leg assembly relative to the top rail in longitudinal direction with respect to the top rail. The anchor block 12 is rigidly and permanently secured to the under surface of rail 10, for example by gluing. Bearing plate 44 is secured within recessed portions of the legs 16, and the head of vertical bolt 18 bears against the upper surface of the plate 44. The under surface of anchor block 12 has a recessed portion to receive the head of the bolt 18.

In assembling the sawhorse, the bolt 18 is inserted in the bearing plate 44 which is placed in the proper position against the anchor block 12, the head of the bolt being received within the recessed portion in the under surface of the anchor block 12. The legs 16 are placed in their proper position, with their inclined surfaces engaging the surfaces 46 of the anchor block, and the upper recessed portions receiving the ends of the bearing plate 44. The proper tension is then applied to the horizontal bolt 20 as shown in FIGURE 1, and to the vertical bolt 18.

Figure 8:
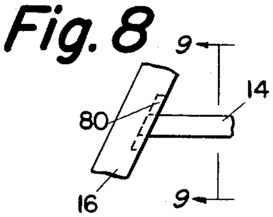
FIGURES 8 and 9 are partial end and sectional side views showing different means of contacting the stretcher block with the legs.
Figure 9:
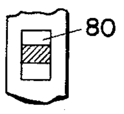

FIGURES 8 and 9 show different means of contact between block 14 and leg 16 as shown in FIGURES 1 and 2, the outer edges of block 14 being received within recessed portions 80 of legs 16. Concave-convex contact of block 14 and legs 16 can alternatively be employed, similar to the contact between block 12 and legs 16.

Figure 10:
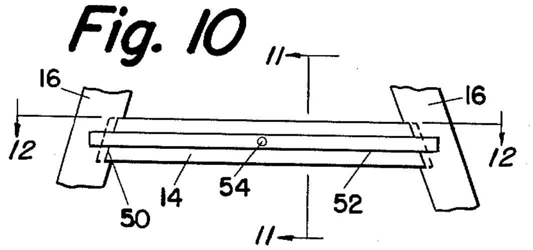
FIGURES 10, 11 and 12 are partial end, sectional side, and sectional plan views, showing different means for attaching the stretcher block to the legs.
Figure 11:
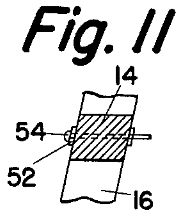
Figure 12:
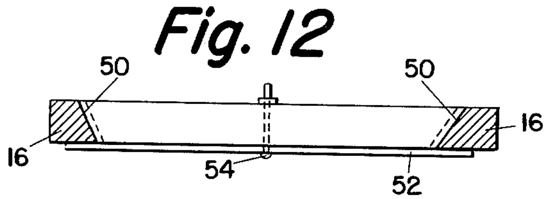

Referring to FIGURES 10, 11 and 12, the stretcher block 14 is similar to that illustrated in FIGURE 1, but tapered from the front surface to the rear surface 50 and received within intermediate recessed portions which have a corresponding taper, so that the block 14 fits tightly within the recessed portions. The block 14 is inserted into the legs from the side, and the strap 52, which is secured to the block 14 by means of a bolt 54, is rotated on the bolt into the position shown in the drawing, thereby to hold the block 14 in position.

Figure 13:
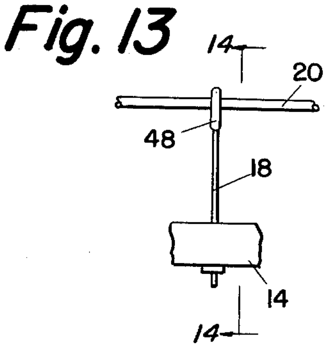
FIGURES 13 and 14 are partial end and sectional side views, illustrating different means for urging the stretcher block toward the spacer block.
Figure 14:
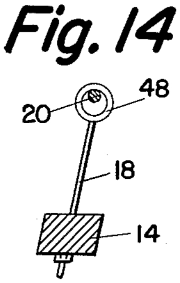

Referring to FIGURES 13 and 14, the vertical bolt 18 has an eye portion 48 through which the horizontal bolt 20 is passed. The arrangement is similar to that illustrated in FIGURES 1 and 2 except that the bolt 18 bears downwardly upon the bolt 20 rather than on the block 12. The effect of adjusting tension on bolt 18 is essentially the same as in FIGURES 1 and 2.

Figure 15:
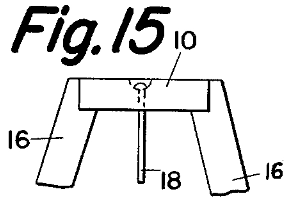
FIGURE 15 is a partial end view showing the use of the top rail to replace the spacer block of the leg assembly.

Referring to FIGURE 15, the legs 16 are directly attached to top rail 10, and the bolt 18 bears upon an upper surface of top rail 10. The other end of bolt 18 bears upon a lower surface of block 14 as shown in FIGURE 1. The leg assembly in this embodiment comprises the two legs, the horizontal and vertical bolts and the lower transverse member or block 14. The leg assemblies are attached to the top rail as part of the assembling procedure, rather than in a separate operation. Adjusting of tension on the two bolts secures the parts together and brings them into proper alignment.

Figure 16:
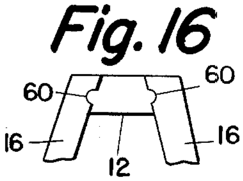
FIGURE 16 is a partial end view showing a different construction of spacer block.

Referring to FIGURE 16, a variant of spacer block 12 is illustrated. The outer edges are inclined upwardly and inwardly, and nodes 60 on those edges are semi-cylindrical in shape and have horizontal axes extending from front to back of block 12. Legs 16 have recessed portions of corresponding shape to receive nodes 60.

Figure 17:
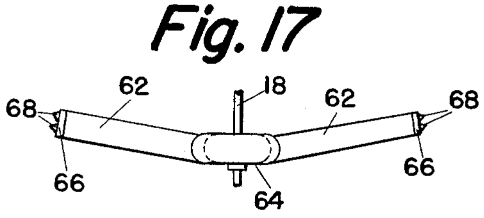
FIGURES 17 and 18 are side and plan views of a different construction of stretcher block.
Figure 18:
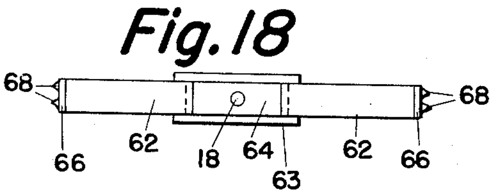

Referring to FIGURES 17 and 18, a jointed stretcher block in three pieces is shown as a variant of the stretcher block 14 of the other figures. The center piece 64 has convex outer edges, and the outer pieces 62 have concave inner edges to receive and fit smoothly around the outer edges of center piece 64. Guide plates 63 are rigidly secured to or integral with center piece 64. Secured to the outer edges of the pieces 62 are metal plates 66, each having sharp metal lugs 68, adapted to pierce the inner surfaces of legs 16, when the stretcher block is in place, and hold the block at the desired horizontal level in the leg assembly. Tightening of bolt 18 causes the stretcher block assembly to become more nearly horizontal and to increase in over-all width, thereby urging the legs apart. This urging of the legs apart is obtained without moving upwardly the outermost edges of the stretcher block, whereas in the structure of FIGURES 1 and 2, such upward moving accompanies the urging of the legs apart. A two-piece stretcher block can also be employed according to the invention.

Figure 19:
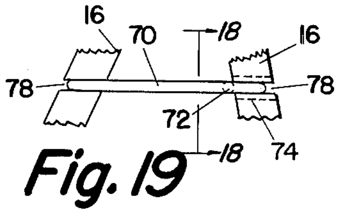
FIGURES 19 and 20 are partial end and sectional side views showing different means for urging the legs toward each other.
Figure 20:
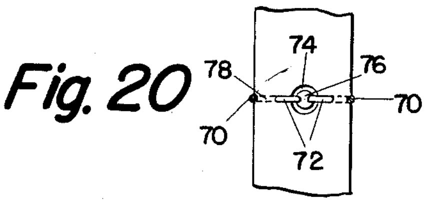

Referring to FIGURES 19 and 20, a wire 70 is shown replacing bolt 20 as shown in FIGURES 1 and 2. The wire is guided by slots 78 in the outer surfaces of legs 16. FIGURE 20 shows the inner surface of a leg 16 and means for fastening the ends of the wire 70. A hole 74 is drilled through the leg 16, and the ends 72 of the wire 70 are brought through the hole to the inner surface of the leg and bent flat against that surface. A cylindrical plug 76 is driven into the hole to hold the ends 72 in place. A wire or any other suitable means for applying adjustable tension can also be employed in place of the vertical bolt 18 shown in other figures.

It is within the scope of the invention to employ, in the various embodiments, in place of the vertical bolt 18 or horizontal bolt 20 or other means for applying variable tension, means for applying substantially constant tension, e.g. a spring, to urge the respective parts toward each other. However, means for applying variable tension are preferred.

The invention claimed is:

1. In a sawhorse comprising a substantially horizontal top rail and two leg assemblies attached to and supporting the rail at each end, each assembly comprising a pair of downwardly diverging legs, the improvement which comprises: in each leg assembly, a horizontal anchor block beneath the rail and secured directly thereto and having outer surfaces engaging inner surfaces of the upper ends of said legs; said rail extending horizontally beyond the outer surfaces of said anchor block, and the upper ends of said legs engaging the bottom of said rail, a portion of which said upper ends extends inwardly of the outer edges of said anchor block; a horizontal stretcher block beneath said anchor block and having outer surfaces engaging inner surfaces of said legs; a vertical adjustable tie member connecting said anchor block and said stretcher block; and a horizontal adjustable tie member connecting said legs at a level between said anchor block and said stretcher block; whereby either or both said tie members can be adjusted to maintain the upper ends of said legs in flush alignment with both said rail and said anchor block.

2. Sawhorse according to claim 1 wherein said outer surfaces of said anchor block are convex, and said inner surfaces of the upper ends of said legs are concave.

3. Sawhorse according to claim 1 wherein each leg assembly additionally comprises a stop secured to the under surface of the rail at a position farther from the end of said rail than said anchor block, and means for releasably holding said anchor block against said stop to support a portion of said anchor block by a portion of said stop.

4. Sawhorse according to claim 1 wherein a recess in each leg receives the outer end of said stretcher block, the height of said recess being greater than the vertical thickness of said stretcher block.

5. Sawhorse according to claim 1 wherein said stretcher block has a middle section engaged by said vertical adjustable tie member, and two outer sections, each engaging said middle section and one of said legs, and adapted to assume a lesser angle with the middle section as the latter moves upwardly.

6. Sawhorse according to claim 1 wherein the stretcher block has fixed horizontal extent and is in slidable relation with the legs.

7. Sawhorse according to claim 1 wherein the ends of the stretcher block are in fixed relation with the legs, and the stretcher block has horizontal extent which increases with increasing upward force exerted by said vertical adjustable tie member.

8. In a sawhorse comprising a substantially horizontal top rail and two leg assemblies attached to and supporting the rail at each end, each assembly comprising a pair of downwardly diverging legs, the improvement which comprises: in each leg assembly, a horizontal anchor block beneath the rail and secured directly thereto and having outer surfaces engaging inner surfaces of the upper ends of said legs; said rail extending horizontally beyond the outer surfaces of said anchor block, and the upper ends of said legs engaging the bottom of said rail, a portion of which said upper ends extends inwardly of the outer edges of said anchor block; a horizontal stretcher block beneath said anchor block and having outer surfaces engaging inner surfaces of said legs; a horizontal adjustable tie member connecting said legs at a level between said anchor block and said stretcher block; and a vertical adjustable tie member connecting said stretcher block and said horizontal adjustable tie member; whereby either or both said tie members can be adjusted to maintain the upper ends of said legs in flush alignment with both said rail and said anchor block.

References Cited in the file of this patent

UNITED STATES PATENTS

| | | |
|---|---|---|
| 92,501 | Witmer | July 13, 1869 |
| 1,462,707 | Lawlor | July 24, 1923 |
| 2,343,557 | Johnson | Mar. 7, 1944 |
| 2,573,740 | Spikings | Nov. 6, 1951 |
| 2,664,319 | Doucette | Dec. 29, 1953 |

FOREIGN PATENTS

| | | |
|---|---|---|
| 247,639 | Switzerland | Dec. 1, 1947 |
| 482,953 | Canada | May 6, 1952 |